May 2, 1939.  J. MOREAU  2,156,398
LUBRICANT RETAINING DEVICE
Filed Nov. 18, 1936  3 Sheets-Sheet 1
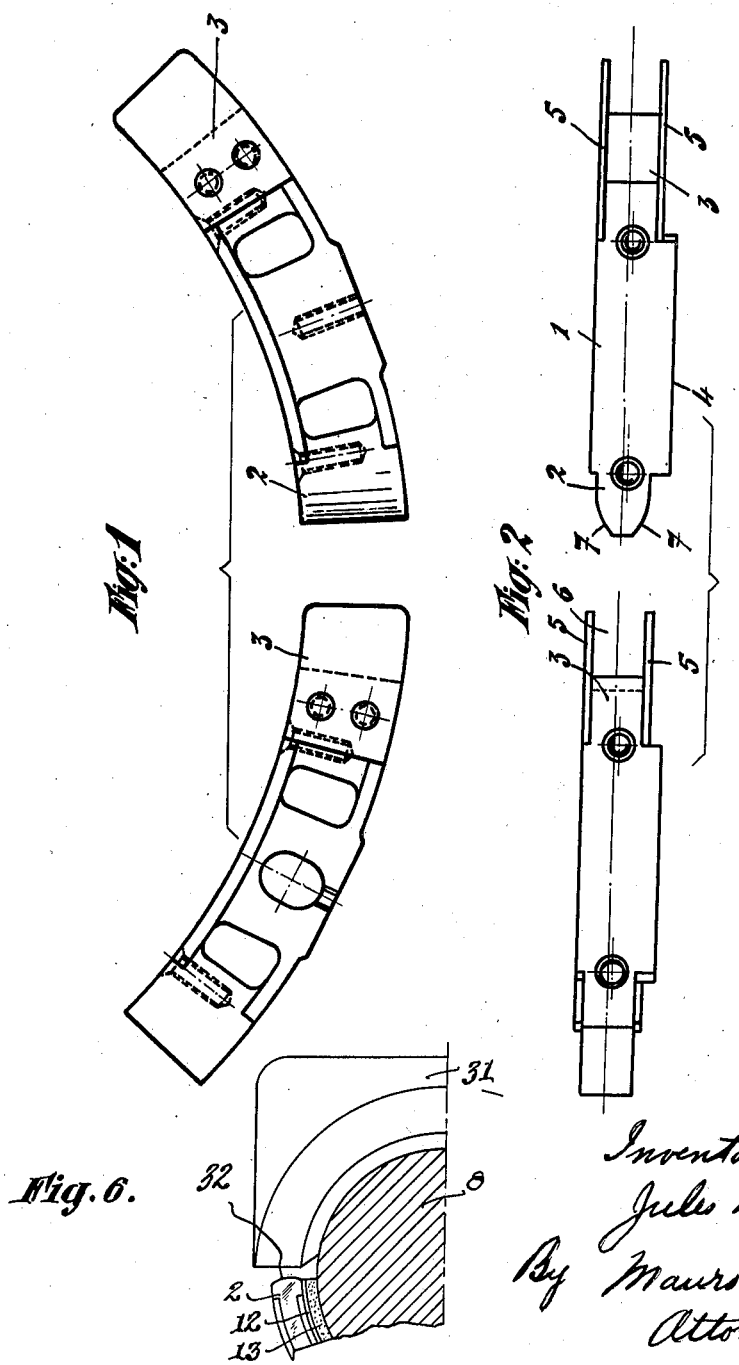

May 2, 1939.                J. MOREAU                2,156,398
LUBRICANT RETAINING DEVICE
Filed Nov. 18, 1936            3 Sheets-Sheet 2
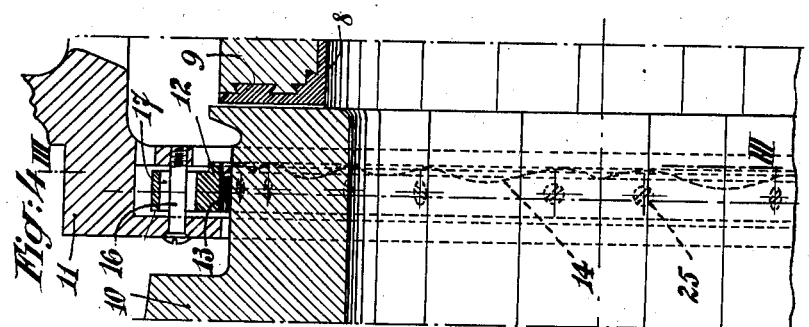
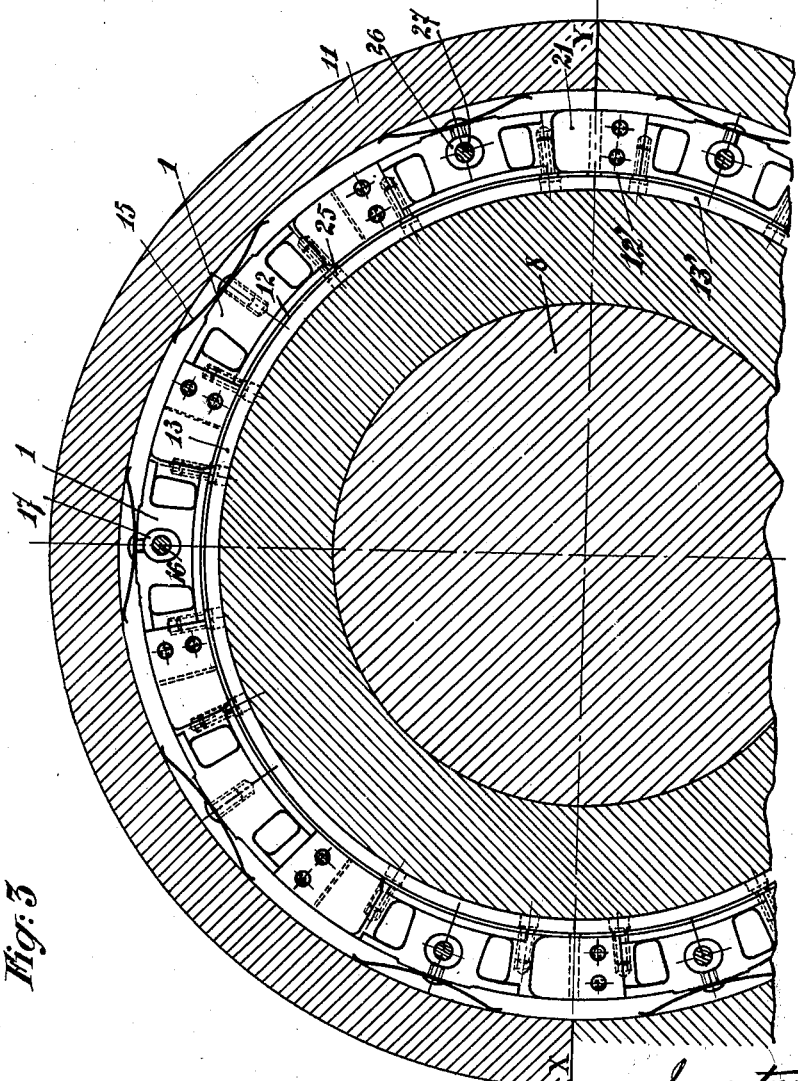

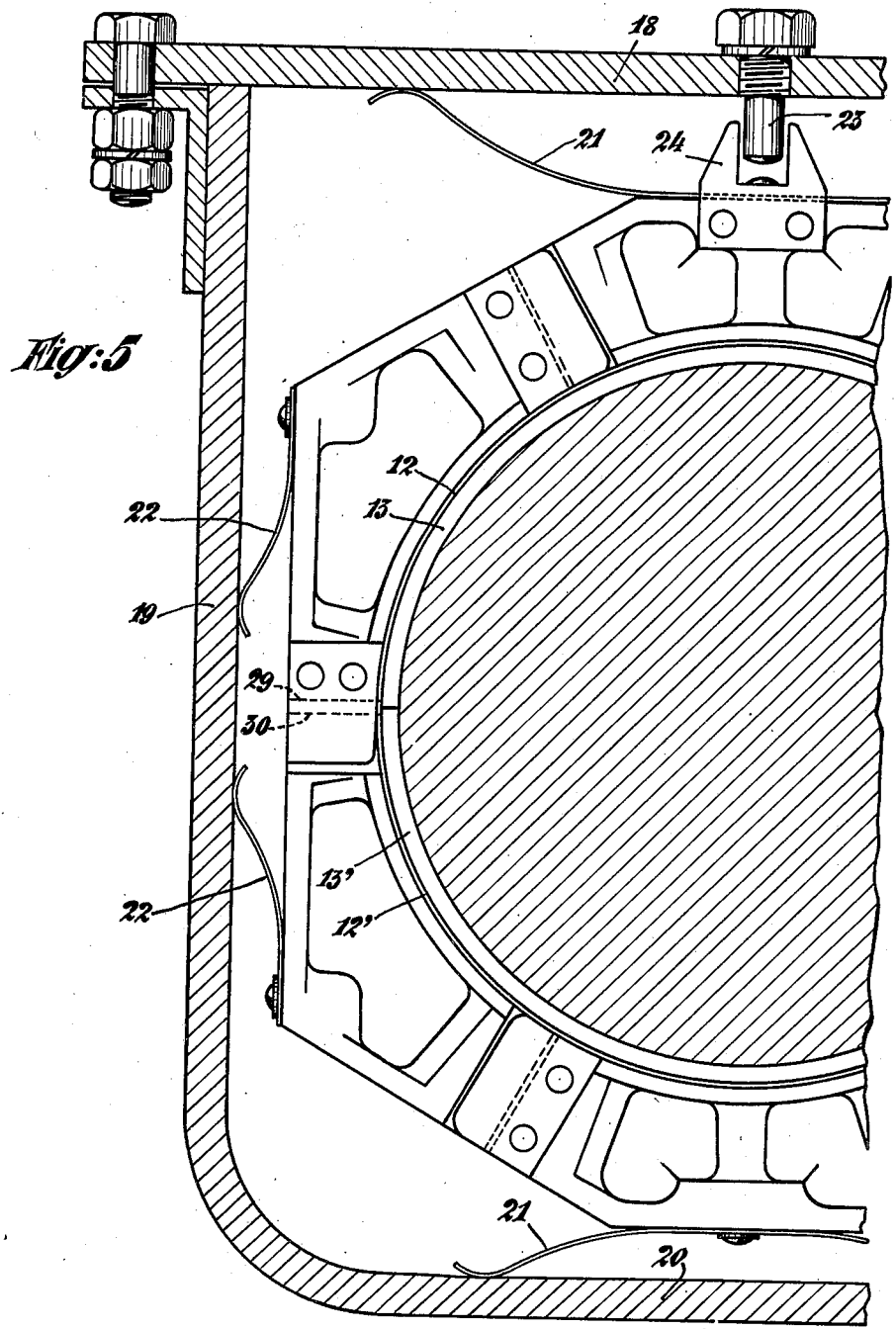

Patented May 2, 1939

2,156,398

UNITED STATES PATENT OFFICE 2,156,398

LUBRICANT RETAINING DEVICE

Jules Moreau, Paris, France

Application November 18, 1936, Serial No. 111,484
In France October 5, 1936

7 Claims. (Cl. 286—6)

In my U. S. Patent No. 1,811,588, patented June 23, 1931, I described a guard for preventing the loss of oil from axle boxes of vehicles and railway cars, and more generally along the journals of shafts capable of having a rotary motion in both directions. This oil guard is characterized by a band of leather or any other material having a low coefficient of friction, which freely surrounds the journal or the shaft and the edge of which is sinuous or toothed in such manner as to throw back toward the inside of the box or the like the oil particles that have come into contact with said band.

The object of the present invention is to provide an oil guard, or more generally lubricant guard, which, in the preferred embodiment, includes this feature of the device above referred to. The essential object of the invention is to provide a guard device of this kind which applies with the same efficiency to shafts, and especially axle journals, of different diameters.

Another object of the invention is to provide a guard device suitable for shafts of different diameters and in which the element or elements acting directly for avoiding losses of lubricant are kept elastically in contact with the shaft independently of the displacements thereof.

The guard device according to the invention essentially includes a flexible member, impervious or little pervious to the lubricant, and a fitting consisting of curved segments or sections disposed end to end in such manner as to be pivoted to each other and to constitute a deformable arc of variable aperture, the fitting being, when in service, connected with the individual segments in such manner as to have no interfering action on the deformability of said arc.

It will be immediately understood that a lubricant guard device made in this manner can be applied to shafts the diameter of which varies within certain limits and that it suffices to keep it in contact with said shaft through any suitable means, preferably elastically, in order that the oil retaining member may play its part with full efficiency. In particular, the guard device keeps its full efficiency when in service in spite of the wear and tear of the shaft journal on which it is bearing.

In the preferred embodiment of the invention, the segments are so arranged as to contribute, in conjunction with the flexible member, to prevent loss of oil and, to this effect, they are mounted with mutual overlap or interengagement; for instance each segment has a tail or tongue engaging a groove in the adjacent segment, or projecting into the space between two cheeks carried by the same.

The segments may be pivoted to one another in any suitable manner, but the following arrangement, which is particularly simple and efficient, is preferably employed: the segments are individually attached to the flexible member which is thus adapted not only to act as a lubricant retainer but also to provide a hinge connection between successive segments; preferably, however, a flexible intermediate strip, such as a metal strip, is interposed between the flexible lubricant retainer and the segments so as to provide said hinge connection.

The arcuate segment bead may be rendered elastic, and resiliently biased a predetermined shape which may conveniently be the shape corresponding to the miximum aperture of the arc as defined by stops on the segments; for instance, I may use for that purpose a connecting strip which besides its being flexible, is also elastic. The segments or some of them may be associated with elastic members such as leaf springs attached thereto for pressing the oil retainer in operative contact with the shaft, this tending to shrink the arcuate segment bead on to the shaft against the biasing action tending to open the arc as above explained.

The lining carried by the deformable frame is preferably constituted as stated in the prior U. S. patent above mentioned.

Especially when the supple lining is to extend over the whole periphery of the shaft, I may make use of a single ring of segments adapted to be slipped on the end of the shaft if this is possible. As a rule, I make use of several series of segments, preferably two, so that the oil retaining device need not be slipped in position upon the end of the shaft. In any case, I arrange the parts so that clearance is left between two successive segments and the adjacent ends of the elastic strip in the case of a single ring of segments, or between end segments of two adjacent series and between the adjacent ends of the flexible strips while lining ends are to be placed in abutting relation.

Other features and provisions will result from the following description of some specific embodiments thereof.

Preferred embodiments of the present invention will be hereinafter described with reference to the accompanying drawings, given merely by way of example, and in which:

Fig. 1 is a front view, and Fig. 2 a plan view of two segments of an oil retaining device according to the present invention, one of these segments being an end segment of a series;

Fig. 3 is a transverse half-section on the line III—III of Fig. 4 of a locomotive gear casing provided wtih an oil retaining device according to the invention;

Fig. 4 is a corresponding longitudinal section;

Fig. 5 is a view analogous to Fig. 3 but relating to the application of the retaining device to a grease box of non circular transverse section.

Fig. 6 is a cross-sectional view similar to Fig. 5 and relating to a further modification.

In the example of Figs. 1 and 2, each segment includes a curved plate 1 constituted for instance by an aluminium alloy and provided at both ends with lugs or tongues 2, 3 of smaller width than the body of the plate. The body may be lightened by apertures leaving between them stiffening ribs. On its internal edge, the plate may be widened so as to form a shoe 4. One of the lugs, lug 3 for instance, is provided on either side with cheeks 5 fixed thereon and extending beyond the end thereof, thus forming a mortise 6 in which is engaged the tenon constituted by lug 2 of the adjacent plate. When this lug belongs to a segment of a series which acts in a manner analogous to a keystone for completing a circle with another series of segments so as to form a complete ring (see Figs. 3 to 5), it is provided with rounded portions as shown at 7 so as to render possible its insertion into the mortise of the adjacent segment. Several plates (at least two) thus assembled end to end form an arc which is completed, for the obtainment of the retaining device, by a flexible lining or oil retainer disposed along the internal edge of the segments, especially along shoes 4.

When, as in the example of Figs. 3 to 5, the retaining device is to extend over the whole periphery of a rotary shaft, the segments which are to form a ring surrounding said shaft belong to several series two for instance in the case of Figs. 3 and 4. A shaft 8 turns in a bearing 9 and is rigid with a hollow shaft or sleeve 10 (which is for instance a sleeve provided with external teeth). The lubricant box is shown at 11. The two series of segments are in the form of two identical half-collars disposed on either side of the line X Y so that it will be sufficient to describe one of them. Such a series carries, on its inner periphery, a flexible and elastic strip 12 on which is fitted a lining 13 of leather or another material having a low coefficient of friction. The right hand side edge (Fig. 4) of this lining, which is applied against the periphery of sleeve 10, is sinuous as indicated at 14 so as to reject the lubricant toward the inside of box 11. Screws 25 or equivalent fixation means serve to ensure connection between lining 13, the elastic strip 12, and the individual segments 1. These segments, or a number of them, carry elastic blades 15 interposed between them and box 11.

The upper segment of the upper series is provided with a hole 17 of oval shape arranged in such manner that its longer axis is disposed vertically (radially); a pin 16 carried by lubricant box 11 passes through hole 17, thus preventing the series of segments to be carried round by the shaft in the peripheral direction; two other segments are provided with holes 26 of oval shape but with their longer axes at right angles to the corresponding radii going from the axis of the shaft to the respective holes. These holes 26 serve, by cooperating with pins 27, to keep the arc of segments correctly opened before it receives the sleeve 10 inserted in the upward direction. Pins 27 may be removed after assembling, but it is quite as simple to constitute them by screws analogous to screw 16 and to leave them in position.

The linings 13 and 13' of the two series of segments have their adjacent edges disposed in abutment along line XY, whereas clearance is left between the adjacent ends of the metallic strips 12 and 12'. In a likewise manner, the tongue 2 of the end segment (said tongue having rounded ends 7 as shown by Fig. 2) does not penetrate right to the bottom of the mortise of the end segment of the lower series of segments.

Owing to the elastic pressure of blades 15, the two series of segments remain applied against the shaft with their linings 13, 13' in abutment even if the shaft gets worn because these linings, which are supple, can shrink under compression at their meeting edges or their edges can be inwardly folded while remaining in contact, under the effect of the centripetal pressure of the springs, when the diameter of the shaft thus happens to decrease.

In the example of Fig. 5, the lubricant box includes plane faces at 18, 19 and 20. The segments are then arranged in such manner as to have rectilinear edges opposite these faces in order that the springs 21, 22 may work under the best conditions. In this example, the lubricant retaining device still comprises two series of segments, the metal strips 12, 12' of which have spaced apart adjacent ends while the flexible lubricant retaining linings 13, 13' of the two series are in abutting relation; also the adjacent end segments such as 29, 30 are not in contact with each other, as shown; each series of segment is prevented from being carried round with the shaft by a fork 24 on one of its segments, and a cooperating stop finger 25 on the lubricant box.

When the lining is to extend only over a portion of the periphery of the shaft, for instance the lower half, whereas the upper half receives a brass, the end segments have rounded edges which ensure, independently of the eventual unevenness of the edges of the brasses, a tangential contact with the latter. Such a structure is shown on Fig. 6 wherein the brass is designated by reference character 31 and the rounded edge is seen at 32.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A lubricant retaining device applicable to rotary shafts which comprises, in combination, a supple lining adapted to be applied against said shaft and capable of stopping said lubricant, a plurality of curvilinear segments disposed end to end, without direct permanent connection between them, a band of an elastic material interposed between said lining and said segments, and means for individually fixing said segments to said band and said lining.

2. A device according to claim 1 adapted to extend around the whole periphery of the shaft including two series of such segments disposed end to end around said periphery, the adjacent ends of the supple linings being adapted to come in contact with each other, whereas the corresponding ends of the series of segments have a play left between them.

3. A device according to claim 7 adapted to extend over only a portion of the periphery of a shaft and to cooperate with a brass, in which the ends of the plurality of segments adapted to bear against said brass are of rounded shape.

4. A lubricant retaining device which comprises an arcuate line of separate segments, a flexible and resilient connecting strip disposed along the inner periphery of said arcuate line, separately attached to each segment, and a continuous lining of packing material on the exposed face of said connecting strip.

5. An articulated segmental device forming a unit in itself, for packing a rotary shaft, which comprises at least two separate segments each having a concave arcuate rim, said segments being disposed in coplanar relation; continuous flexible lubricant impervious means running successively along the concave arcuate rims of the segments, so as to form an arch adapted to pack said rotary shaft, said means being separately attached to each segment along the concave arcuate rim thereof; and loosely interengaging means at the adjacent ends of successive segments for holding said segments in co-planar relation.

6. The combination of a revolving shaft; a non rotary structure about said shaft, an arcuate chain of successive separate segments around a portion of said shaft, between the latter and the non rotary structure; continuous flexible, lubricant impervious means on the inner periphery of the segment chain, separately attached to each segment and adapted to embrace said portion of the shaft, for flexibly linking said segments to one another; resilient means incorporated in the arcuate chain for biasing the same to a larger radius; and second resilient means adapted in operation to supersede the first mentioned resilient means, and interposed between the arcuate chain and said non rotary structure for biasing the arcuate chain to a smaller radius, so as to resiliently apply the lubricant proof linking means in operative contact with the shaft.

7. For packing a revoluble shaft, a lubricant retaining resilient chain adapted to be wrapped over a peripheral portion of said shaft, which comprises a series of successive segment-like links having loosely interengaged adjacent ends so as to form substantially lubricant-proof joints while permitting relative movement of said ends; lubricant impervious, flexible means, positioned for direct contact with the shaft, for hinging any two successive links together; and resilient means incorporated in the chain for biasing said chain to an arcuate shape of larger radius than the radius of the shaft.

JULES MOREAU.